US006762779B2

(12) United States Patent
Miho et al.

(10) Patent No.: US 6,762,779 B2
(45) Date of Patent: Jul. 13, 2004

(54) IMAGE FORMING APPARATUS, METHOD OF MANUFACTURING SUBSTRATE FOR PHOTORECEPTOR, SUBSTRATE FOR PHOTORECEPTOR, AND PHOTORECEPTOR

(75) Inventors: Hiroaki Miho, Hachioji (JP); Shigetaka Kurosu, Hino (JP); Hiroshi Morimoto, Akiruno (JP); Satoshi Nishida, Saitama (JP); Masashi Saito, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/341,202

(22) Filed: Jan. 13, 2003

(65) Prior Publication Data

US 2003/0137576 A1 Jul. 24, 2003

(30) Foreign Application Priority Data

Jan. 22, 2002 (JP) ..................................... P2002-012453
Mar. 19, 2002 (JP) ..................................... P2002-076067

(51) Int. Cl.[7] ............................................. G03G 15/00
(52) U.S. Cl. ......................................... 347/129; 430/69
(58) Field of Search ................................. 347/129, 131, 347/140; 430/69, 110.3, 110.4

(56) References Cited

U.S. PATENT DOCUMENTS 6,317,220 B1 * 11/2001 Fujita et al. ................. 347/131
6,610,453 B2 * 8/2003 Akai et al. ............... 430/110.3

FOREIGN PATENT DOCUMENTS

JP          11-102080 A    *  4/1999

* cited by examiner

Primary Examiner—Susan S. Y. Lee
(74) Attorney, Agent, or Firm—Frishauf, Holtz, Goodman & Chick, P.C.

(57) ABSTRACT

An image forming apparatus, which includes a photoreceptor having a substrate whose surface having been subjected to a surface processing with a cutting tool, and a photosensitive layer formed on the substrate; an exposure device for exposing an image on the photoreceptor to form a latent image, having a light source for emitting a light beam, and carrying out exposure in a manner of dot arrangement through a main scanning by the deflection of the light beam and a sub-scanning by a movement of the photoreceptor; a developing device; and a transfer device. The apparatus is characterized in that the exposure device carries out scanning exposure with a spatial frequency of dot arrangement pitch of not less than 4 dots/mm in the main scanning direction, and surface roughness Rz of the substrate in the main scanning direction is not greater than 1.5 $\mu$m.

16 Claims, 10 Drawing Sheets

FIG. 4(a)
EXAMPLE 1
RZ = 1.038 μm
X = 0.1mm
R = 5mm
Z = 0.0002mm

FIG. 4(b)
EXAMPLE 2
RZ = 1.209 μm
X = 0.2mm
R = 20mm
Z = 0.0002mm

FIG. 4(c)
EXAMPLE 3
RZ = 1.151 μm
X = 0.13mm
R = 5mm
Z = 0.00042mm

FIG. 5(a)
REFERENCE 1
RZ = 1.6356 μm
X = 0.2mm
R = 5mm
Z = 0.001mm

FIG. 5(b)
REFERENCE 2
RZ = 2.337 μm
X = 0.26mm
R = 5mm
Z = 0.0017mm

FIG. 5(c)
REFERENCE 3
RZ = 2.805 μm
X = 0.3mm
R = 5mm
Z = 0.0022mm

| CURVATURE RADIUS OF CUTTING TOOL R (mm) | CUTTING TOOL PITCH X (mm) | | | | | | |
|---|---|---|---|---|---|---|---|
| | 0.05 | 0.10 | 0.13 | 0.15 | 0.20 | 0.26 | 0.30 |
| 1 | 0.00031 | 0.00125 | 0.00211 | 0.00281 | 0.00500 | 0.00844 | 0.01123 |
| 3 | 0.00010 | 0.00042 | 0.00070 | 0.00094 | 0.00167 | 0.00282 | 0.00375 |
| 5 | 6.2E-05 | 0.00020 | 0.00042 | 0.00056 | 0.00100 | 0.00170 | 0.00220 |
| 7 | 4.5E-05 | 0.00018 | 0.00030 | 0.00040 | 0.00071 | 0.00121 | 0.00161 |
| 10 | 3.1E-05 | 0.00012 | 0.00021 | 0.00028 | 0.00050 | 0.00084 | 0.00112 |
| 15 | 2.1E-05 | 8.3E-05 | 0.00014 | 0.00019 | 0.00033 | 0.00056 | 0.00075 |
| 20 | 1.6E-05 | 6.2E-05 | 0.00011 | 0.00014 | 0.00020 | 0.00042 | 0.00056 |
| 25 | 1.2E-05 | 5.0E-05 | 8.4E-05 | 0.00011 | 0.00020 | 0.00034 | 0.00045 |
| 30 | 1.0E-05 | 4.2E-05 | 7.0E-05 | 9.4E-05 | 0.00017 | 0.00028 | 0.00037 |
| 40 | 7.8E-06 | 3.1E-05 | 5.3E-05 | 7.0E-05 | 0.00012 | 0.00021 | 0.00028 |

NOTE: 6.2E-05 = $6.2 \times 10^{-5}$

IMAGE FORMING APPARATUS, METHOD OF MANUFACTURING SUBSTRATE FOR PHOTORECEPTOR, SUBSTRATE FOR PHOTORECEPTOR, AND PHOTORECEPTOR

BACKGROUND OF THE INVENTION

This invention relates to an image forming apparatus, and in particular, to a photoreceptor for use in an image forming apparatus and a manufacturing method thereof.

In a digital image forming apparatus, an image is formed through the processes of dot exposure by means of a laser, an array of light emitting diodes (LED's), or the like, and development. On the other hand, a photoreceptor as an image carrying member is composed of a substrate made of metal such as aluminum and a photosensitive layer; however, there is a problem that, in exposure, it occurs an interference phenomenon between light reflected by the surface of the image carrying member and light reflected by the surface of the substrate, to influence image quality.

In an image forming apparatus capable of forming a multi-color image, generally speaking, by means of a cylindrical or belt-shaped image carrying member which is being rotated (moved), charging, exposure, and development are carried out for each of the colors, the component color toner images are successively superposed on the image carrying member, and the superposed color toner images are transferred onto a transfer paper sheet by one-time transfer operation, to form a multi-color image.

The exposure is carried out by the scanning of the surface of the image carrying member by a laser beam; in the case of a cylindrical image carrying member, it is formed of a cylindrical metallic substrate (mainly aluminum is used) coated with a photosensitive layer (an OPC, for example). However, the thickness of the photosensitive layer fluctuates with the surface state of the substrate fluctuating, and interference fringes (moire) caused by the laser beam reflected by the surface of the photosensitive layer and the laser beam reflected by the surface of the substrate are generated, to bring about defects in an image formed.

For a countermeasure of the above-mentioned problem, to roughen the surface of the substrate, to provide a subbing layer containing fine particles between the substrate and the photosensitive layer, etc. are considered.

It has been known as one of the above-mentioned countermeasures a method to apply cut working to the surface of the substrate with a cutting tool. By this method, caused by the feed pitch of the cutting tool, linear surface inequalities (linear projections and concavities) having a definite size are formed with a definite pitch in a definite direction on the surface of the substrate.

On the other hand, as regards the dot arrangement for image formation, a method of error diffusion is generally used; but in recent years, it has been put into practice to adopt an arrangement method in which dots are arranged with a definite pitch in one direction. By this dot arrangement, it is possible to make a dot image have a sufficient gradation.

However, in cases where linear surface inequalities having a definite size are formed with a definite pitch in a definite direction as described in the above, and an image is formed, using an arrangement method in which dots are arranged with a definite pitch in one direction, on an image carrying member having a substrate with its surface roughened to a definite roughness by cut working with a cutting tool, density unevenness caused by a moire is produced in some cases although it depends on the pitch of the linear surface inequalities on the substrate of the image carrying member and the pitch of the dots.

Further, the above-mentioned conventional technology has a limit in its application to an image formation process with improved gradation or the like, and it is difficult to prevent sufficiently the degradation of image quality. In particular, it has been proved that, in an image forming method in which the arrangement of dots making up an image was made denser in one direction for the purpose of improving the gradation representation performance, a moire caused by the interference between the arrangement of dots and the linear surface inequalities on the substrate was produced to lower the image quality.

It is an object of this invention to solve such a problem and provide an image forming apparatus capable of forming a high-quality image having no density unevenness.

It is another object of this invention to provide an image forming apparatus having the generation of density unevenness suppressed by the practice of image formation with the pitch of the linear surface inequalities of the substrate of an image carrying member and the arrangement of dots taken into consideration.

SUMMARY OF THE INVENTION

The above-mentioned object can be accomplished by any one of the structures of the invention described below.

(1) An image forming apparatus which is equipped with a photoreceptor having a substrate with its surface subjected to surface processing with a cutting tool and a photosensitive layer formed on said substrate and an exposure means having a light source for emitting a light beam, and carries out exposure in a manner of an arrangement of dots through main scanning by the deflection of said light beam and the sub-scanning by the movement of said photoreceptor, characterized by said exposure means carrying out scanning exposure with a spatial frequency of the arrangement pitch of dots of 4 dots/mm in said main scanning direction, and the surface roughness Rz of said substrate in said main scanning direction being not greater than 1.5 $\mu$m.

(2) An image forming apparatus which is equipped with a photoreceptor having a substrate with its surface subjected to surface processing with a cutting tool and a photosensitive layer formed on said substrate and an exposure means having a light source for emitting a light beam, and carries out exposure in a manner of an arrangement of dots through main scanning by the deflection of said light beam and the sub-scanning by the movement of said photoreceptor, characterized by said exposure means carrying out scanning exposure with a spatial frequency of the arrangement pitch of dots of 4 dots/mm in said main scanning direction, and said substrate, as regards its cross-sectional surface shape in said main scanning direction, having substantially no projections and concavities of a period corresponding to the feed pitch of the cutting tool in said surface processing with a cutting tool.

(3) An image forming apparatus which is equipped with a photoreceptor having a substrate with its surface subjected to surface processing with a cutting tool and a photosensitive layer formed on said substrate and an exposure means having a light source for emitting a light beam, and carries out exposure in a manner of an arrangement of dots through main scanning by the deflection of said light beam and the sub-scanning by the movement of said photoreceptor, characterized by said exposure means carrying out scanning exposure with a spatial frequency of the arrangement pitch of dots of 4 dots/mm in said main scanning direction, and said substrate having a surface subjected to a surface processing satisfying the following condition:

$$R-R \cos [\{(X/2)/2\pi R\}\times 360]<0.001,$$

where R denotes the radius of curvature (mm) of the edge corner of a cutting tool used in said surface processing, and X denotes the feed pitch of the cutting tool (mm) in said surface processing.

(4) An image forming apparatus as set forth in any one of the above-mentioned structures (1) to (3), characterized by the aforesaid exposure means carrying out exposure with a dot arrangement such that the dot density in the sub-scanning direction is made larger than the dot density in the main scanning direction.

(5) An image forming apparatus as set forth in any one of the above-mentioned structures (1) to (4), characterized by comprising a developing means for developing a latent image using a toner composed of toner particles having a number-average particle diameter of 2 $\mu$m to 7 $\mu$m.

(6) An image forming apparatus as set forth in any one of the above-mentioned structures (1) to (5), characterized by the aforesaid substrate being made of a metallic cylinder.

(7) A method of manufacturing a substrate for a photoreceptor made of a metallic cylinder characterized by comprising the step of carrying out a surface processing to be applied to its surface satisfying the following condition:

$$R-R \cos [\{(X/2)/2\pi R\}\times 360]<0.001,$$

where R denotes the radius of curvature (mm) of the edge corner of a cutting tool used in said surface processing, and X denotes the feed pitch of the cutting tool (mm) in said surface processing.

(8) A substrate for a photoreceptor characterized by being manufactured by a manufacturing method of a substrate for a photoreceptor wherein a surface processing to be applied to its surface satisfying the following condition is carried out:

$$R-R \cos [\{(X/2)/2\pi R\}\times 360]<0.001,$$

where R denotes the radius of curvature (mm) of the edge corner of a cutting tool used in said surface processing, and X denotes the feed pitch of the cutting tool (mm) in said surface processing.

(9) A substrate for a photoreceptor characterized by being manufactured by a manufacturing method of a substrate for a photoreceptor wherein a surface processing to be applied to its surface satisfying the following condition is carried out:

$$R-R \cos [\{(X/2)/2\pi R\}\times 360]<0.001,$$

where R denotes the radius of curvature (mm) of the edge corner of a cutting tool used in said surface processing, and X denotes the feed pitch of the cutting tool (mm) in said surface processing; and a photoreceptor characterized by comprising a photosensitive layer formed on said substrate.

(10) A photoreceptor as set forth in the above-mentioned structure (9), characterized by the aforesaid photoreceptor having a thickness of 10 $\mu$m to 30 $\mu$m.

(11) An image forming apparatus which forms a latent image composed of a plurality of dots through the scanning of a cylindrical image carrying member in the lengthwise direction by a light beam emitted from a light source to make a latent image component in the main scanning direction, and forms a plurality of said latent image components in the rotating direction of the cylindrical image carrying member, that is, in the sub-scanning direction to form a latent image, characterized by the surface of the substrate of said image carrying member having linear surface inequalities (projections and concavities) caused by the feed pitch of the cutting tool formed in cut working, said latent image consisting of a plurality of dot lines formed in the sub-scanning direction arrayed at equal intervals, that is, with a pitch in the main scanning direction, and each of said plurality of dot lines being formed at an angle not smaller than a specified angle with the direction of the linear surface inequalities formed on the surface of said substrate of said image carrying member.

(12) An image forming apparatus as set forth in the structure (11), characterized by the aforesaid specified angle being not smaller than 30°.

(13) An image forming apparatus which forms a latent image composed of a plurality of dots through the scanning of a cylindrical image carrying member in the lengthwise direction by a light beam emitted from a light source to make a latent image component in the main scanning direction, and forms a plurality of said latent image components in the rotating direction of the cylindrical image carrying member, that is, in the sub-scanning direction to form a latent image, wherein the surface of the substrate of said image carrying member has linear surface inequalities caused by the feed pitch of the cutting tool formed in cut working, said latent image consists of a plurality of dot lines formed in the sub-scanning direction arrayed at equal intervals in the main scanning direction, and each of said plurality of dot lines is formed at an angle not smaller than a specified angle with the direction of the linear surface inequalities formed on the surface of said substrate of said image carrying member, characterized by one or both of said feed pitch of the cutting tool and said pitch of the array of said dot lines in the main scanning direction being determined so as to make the difference between the number of said surface inequalities per unit length and the number of said dot lines per unit length not smaller than a specified number.

(14) An image forming apparatus as set forth in the structure (13), characterized by the aforesaid specified number being not less than 1 line per 1 mm.

(15) An image forming apparatus as set forth in the structure (13), characterized by the aforesaid specified angle being not larger than 30°.

(16) An image forming apparatus as set forth in any one of the structures (11) to (15), characterized by the surface of the substrate of the aforesaid image carrying member having finer surface inequalities between the projections formed by the feed pitch of the cutting tool in cut working.

DETAILED DESCRIPTION OF THE PREFERRED EMBODIMENT

Example of the Embodiment of Invention (1)

Figure 1:
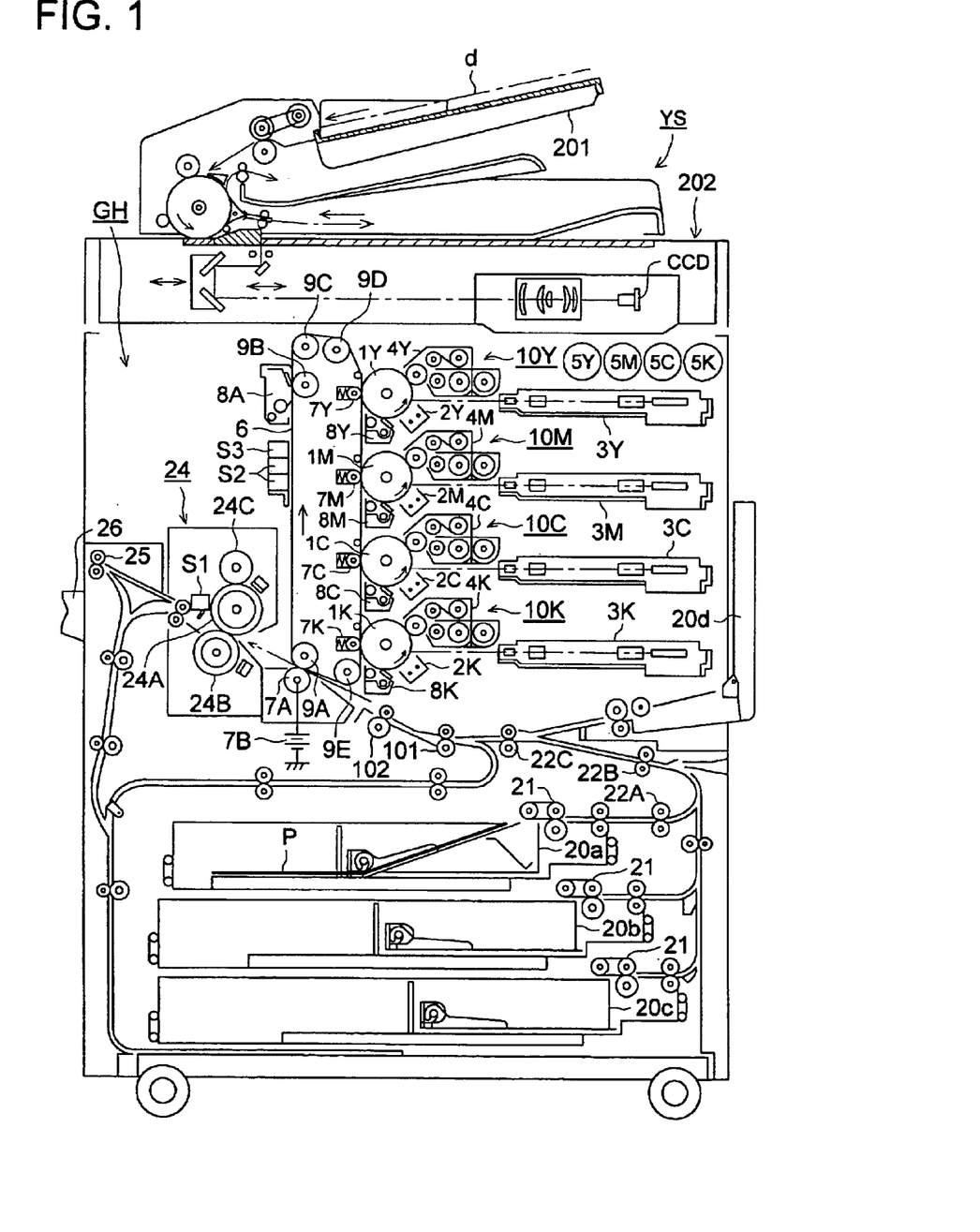
FIG. 1 is a drawing showing an image forming apparatus according to the embodiment of this invention.

FIG. 1 is a drawing showing the overall structure of a color copying machine as an example of an image forming apparatus according to the embodiment of this invention consisting of an image forming apparatus mainframe GH and an image reading apparatus YS.

The image forming apparatus mainframe GH is one that is called a color image forming apparatus of a tandem type, and consists of a plurality of image forming units 10Y, 10M, 10C, and 10K, a belt-shaped intermediate transfer member 6, a paper feed section, and a fixing means 24.

The image forming unit 10Y for forming an image of yellow color comprises a charging means 2Y, an exposure means 3Y, a developing means 4Y, and a cleaning means 8Y, all being arranged opposite to the circumference of a photoreceptor 1Y as an image carrying member. The image forming unit 10M for forming an image of magenta color comprises a photoreceptor 1M as an image carrying member, a charging means 2M, an exposure means 3M, a developing means 4M, and a cleaning means 8M. The image forming unit 10C for forming an image of cyan color comprises a photoreceptor 1C as an image carrying member, a charging means 2C, an exposure means 3C, a developing means 4C, and a cleaning means 8C. The image forming unit 10K for forming an image of black color comprises a photoreceptor 1K as an image carrying member, a charging means 2K, an exposure means 3K, a developing means 4K, and a cleaning means 8K. The charging means 2Y and the exposure means 3Y, the charging means 2M and the exposure means 3M, the charging means 2C and the exposure means 3C, and the charging means 2K and the exposure means 3K, make up respective latent image forming means.

The intermediate transfer member 6 is trained about a drive roller 9A and driven rollers 9B to 9E, and moves circulating as shown by the arrow mark during image formation.

The component color images formed by the respective image forming units 10Y, 10M, 10C, and 10K are successively transferred onto the intermediate transfer member 6 by the respective transfer means 7Y, 7M, 7C, and 7K (primary transfer), to form a composite color image. The color forming units 10Y, 10M, 10C, and 10K for forming a color image on the intermediate transfer member 6, and the transfer means 7Y, 7M, 7C, and 7K make up an image forming means.

A recording medium P contained in one of a plurality of paper feed cassettes 20a, 20b, and 20c as an accommodating section for accommodating recording media P is fed by a paper feed means 21 consisting of a taking-out roller and a separation member, and is conveyed through a paper feed rollers 22A, 22B, and 22C, and a registration roller 102, etc., to a transfer roller 7A as a transfer means with a transfer voltage applied by a power source 7B, by which a color image is transferred onto the recording medium P (secondary transfer).

The recording medium P, having a color image formed, is detached off the intermediate transfer member 6 by a drive roller 9A as a detaching means. The detaching means is made up of a drive roller 9A consisting of coaxial small rollers, and by the sharp bending of the intermediate transfer member in compliance with a small curvature of the drive roller 9A, the recording medium P is detached off the intermediate transfer member 6 by the utilization of the straight moving tendency of a paper sheet.

At each of the cassettes 20b and 20c, the paper feed means 21 and the feeding roller 22A are provided (signs are omitted) The recording medium conveyance path from the paper cassettes 20a, 20b, 20c, and the path from the manual paper feed table 20d or from the inversion conveyance unit for duplex copying are joined together at the upstream side of a bend forming roller 101; thus, the recording medium P is fed to the bend forming roller 101 from a single recording medium conveyance path. The recording medium P having a color image transferred on it undergoes fixing processing by the fixing means 24, and is gripped by the ejection rollers 25 to be placed on a output tray 26 outside the machine. The fixing means 24 consists of an upper roller 24A, a lower roller 24B, both being provided with a heater inside, cleaning roller 24c, etc.

On the other hand, after a color image is transferred to the recording medium P by the transfer roller 7A, the intermediate transfer member 6, having the recording medium detached off it, is cleaned by a cleaning means 8A.

5Y, 5M, 5C, and 5K are toner replenishing means for replenishing the developing means 4Y, 4M, 4C, and 4K respectively with fresh toner. S1, S2, and S3 are sensors.

On the image forming apparatus mainframe GH, the image reading apparatus YS consisting of an automatic document feeder 201 and a document image scanner 202 is mounted. A document sheet d placed on the document table of the automatic document feeder 201 is conveyed by a registration conveyance means, and an image on one side or both sides of the document sheet is exposed to light through the moving optical system of the document image scanner 202, and is read by a line image sensor CCD in a scanning way.

An analog signal obtained by the photoelectric conversion by the line image sensor CCD, after being subjected to analog processing, A/D conversion, shading correction, image compression processing, etc. in an image processing section, is inputted to the exposure means 3Y, 3M, 3C, and 3K.

The automatic document feeder 201 is equipped with a both-sided document conveying means. It is possible that the automatic document feeder 201 continuously reads the image on each sheet of a document d having multiple sheets fed from on the document placing table and stores the image data in a storage means (electronic RDH function); therefore, it is possible to copy the content of the document d having multiple sheets by the copying function, and it is also possible to transmit the image data of the document d having multiple sheets by the facsimile function.

Figure 2:
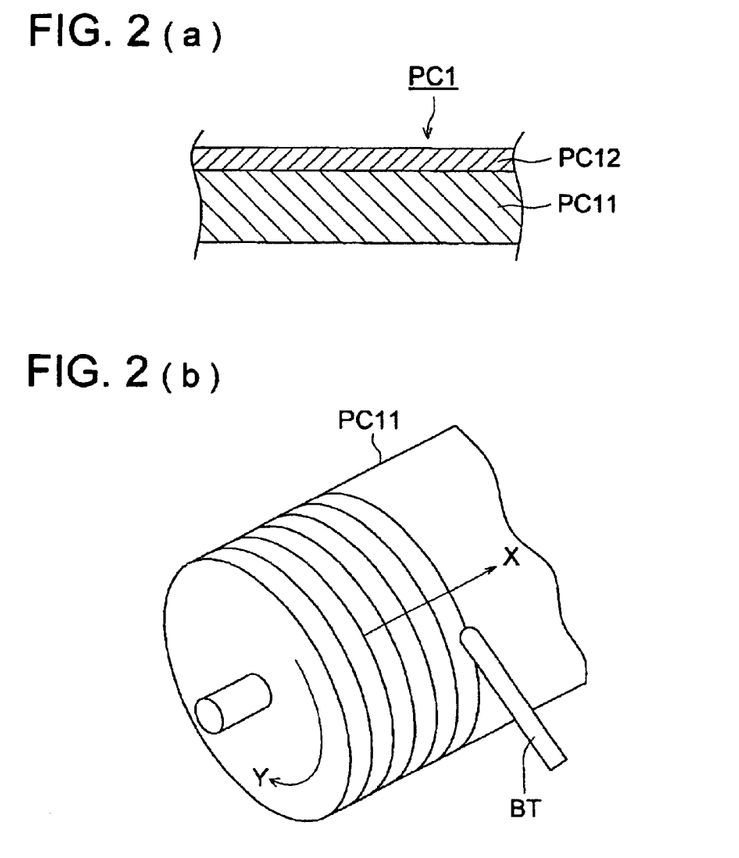
FIG. 2(a) and FIG. 2(b) are enlarged cross-sectional views of a photoreceptor according to the embodiment of this invention.

In the following, with reference to the drawings of FIG. 2 and further, the photoreceptors as image carrying members 1Y, 1M, 1C, and 1K and the manufacturing method thereof will be explained. In addition, in FIG. 2, any one of the photoreceptors 1Y, 1M, 1C, and 1K is called representatively the photoreceptor PC1.

As shown in FIG. 2(a), the photoreceptor PC1 is formed of a cylindrical substrate PC11 and a photosensitive layer PC12 coated thereon. The substrate PC11 is formed of a cast aluminum cylinder subjected to a surface processing of cut working with a cutting tool. The photosensitive layer PC12 is composed of an organic photosensitive layer formed by a coating method such as a slide coating by a circular slide hopper, or spray coating to have a thickness of 10 μm to 30 μm.

As shown in FIG. 2(b), the surface processing of the substrate PC11 is such that, while the substrate PC11 being rotated, the surface of the substrate PC11 is made to have a specified surface roughness by the movement of a cutting tool BT at a constant rate in the X direction.

Figure 3:
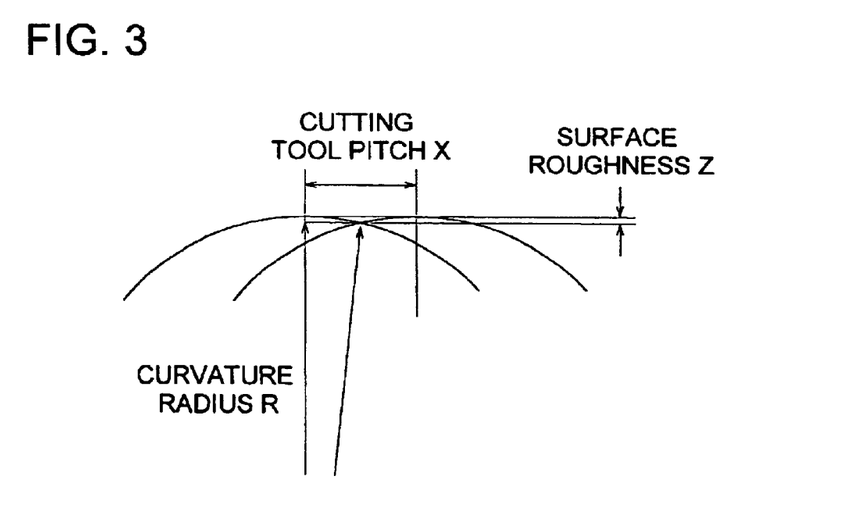
FIG. 3 is a drawing showing parameters of processing condition in working by a cutting tool of a substrate.

The surface state of the substrate PC11 is determined mainly by the radius of curvature of the cutting tool representing the shape of corner of the cutting edge of the cutting tool BT, and the feed pitch of the cutting tool X which is the amount of moving of the cutting tool BT during one rotation of the substrate PC11. In FIG. 3, parameters of processing condition in cut working with a cutting tool are shown.

The property of the photoreceptor PC1 in relation to the substrate PC11 can be evaluated mainly by the surface roughness of the substrate PC11. There are various ways of expressing surface roughness, and in this example of the embodiment, a measured surface roughness Rz defined in the following way and a calculated surface roughness Z are used.

Surface roughness Rz: ten-point height of irregularities specified by JIS B601, which is expressed in μm by the sum of the average value of the height of peaks from the top to the fifth in the sampling length (2.5 mm in this example of the embodiment) and the average value of the depth of valleys from the deepest to the fifth.

Surface roughness by calculation Z: the difference in height between a valley and a peak of a roughness profile having valleys corresponding to the vertex points of the cutting tool BT and peaks corresponding to the crossing point of neighboring edge corner contours of the cutting tool BTn and BTn+1 with the pitch X, expressed by the following equation. In addition, the edge corner contour of the cutting tool BTn+1 with respect to the edge corner contour of the cutting tool BTn means the edge corner contour of the cutting tool BT after one rotation of the substrate PC11 from the edge corner contour BTn.

$$Z = R - R \cos\{(X/2) \times 360/2\pi R\},$$

where R denotes the radius of curvature of the edge corner of the cutting tool BT (mm), and X denotes the feed pitch of the cutting tool (mm).

As the result of a series of image formation using photoreceptors PC1 formed of a photosensitive layer PC12 formed on various kinds of substrate PC11 respectively which had been subjected surface processing with the processing condition changed, for image formations based on a dot arrangement of 4 dots/mm in the main scanning direction which is the feeding direction of the cutting tool, a clear image was obtained without a moire being produced, when the condition Rz≦1.5 μm or Z≦1 μm was satisfied.

Figure 7:
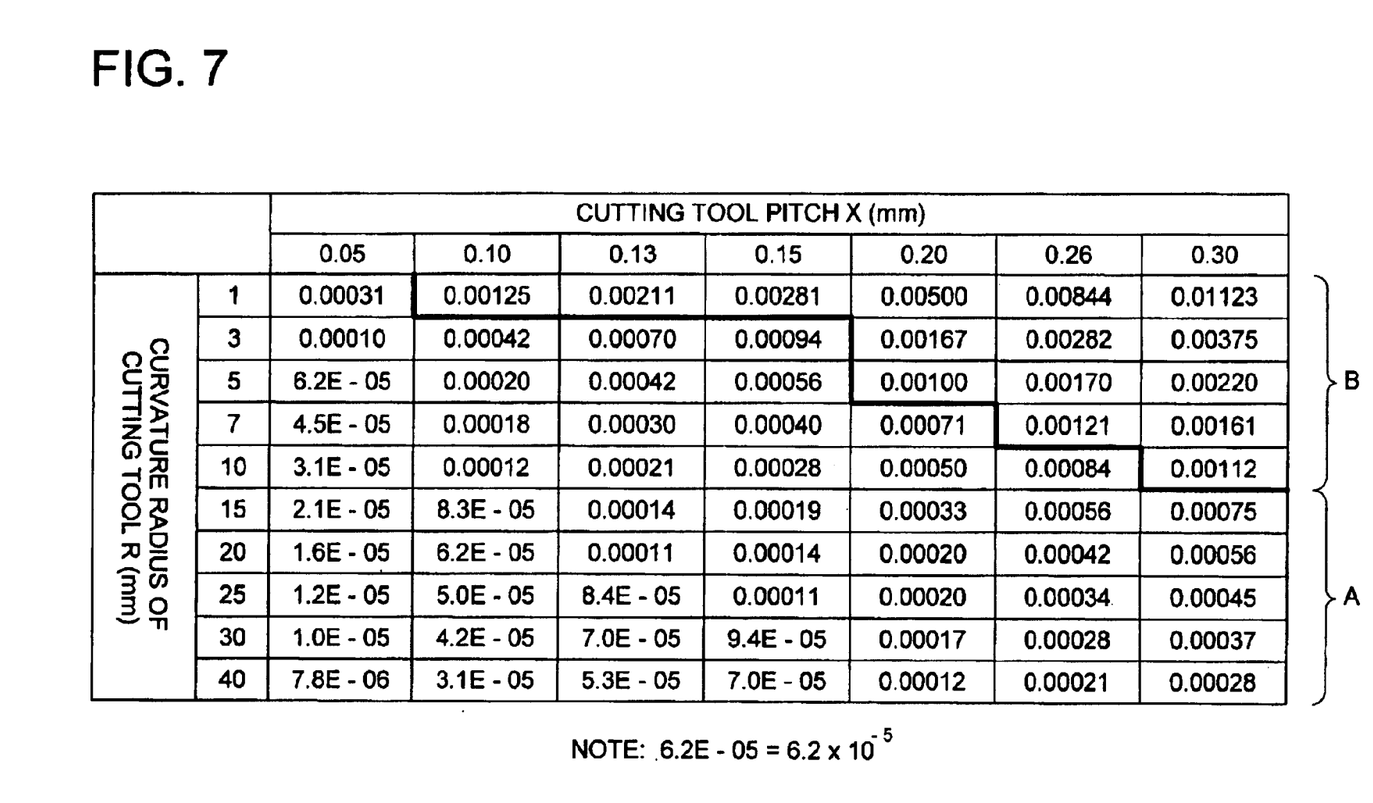
FIG. 7 is a drawing showing the result of the calculation of surface roughness for various values of radius of curvature and feed pitch of a cutting tool.

FIG. 7 shows the result of calculation of the surface roughness Z for various values of radius of curvature of edge corner R and cutting tool pitch X using the equation Z=R−R cos {(X/2)×360/2πR}.

In the drawing, the region A in the lower side of the border line shown by the heavy solid folded line is the range where a good image can be formed, and the region B in its upper side is the range where density unevenness is produced. In addition, the experiment to form an image and evaluate the image quality of the image formed was carried out for the representative points in FIG. 7 sampled.

The following are concluded from the result shown in FIG. 7, and the results of the examples of practice and the examples for comparison to be explained below.

In an image formation having a spatial frequency of the dot arrangement [pitch] in the main scanning direction of 4 dots/mm, (1) An image having no density unevenness can be formed for a measured surface roughness Rz of 1.5 μm or under. Besides, it is desirable that the surface roughness Rz is not smaller than 0.5 μm. If the surface roughness Rz does not reach 0.5 μm, density unevenness based on the interference fringes caused by the unevenness of coating of the photosensitive layer is produced in some cases.

(2) An image having no density unevenness can be formed by the use of a substrate on which substantially no linear surface inequalities corresponding to the feed pitch of the cutting tool is observed.

(3) An image having no density unevenness can be formed for a calculated surface roughness Z smaller than 1 μm.

Figure 6A:
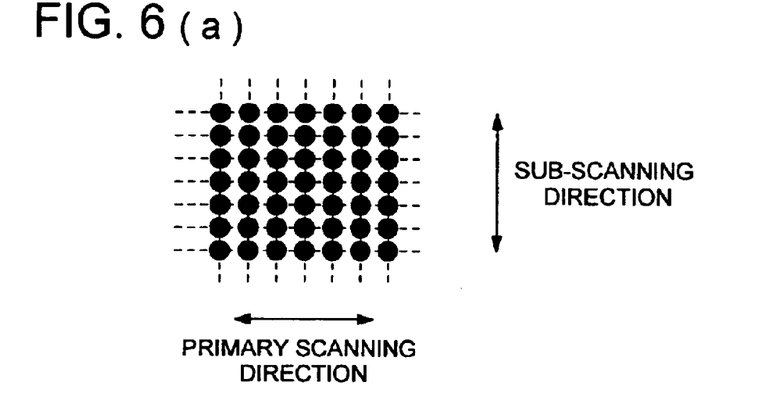
FIG. 6(a) to FIG. 6(c) are drawings showing dot arrangements.
Figure 6B:
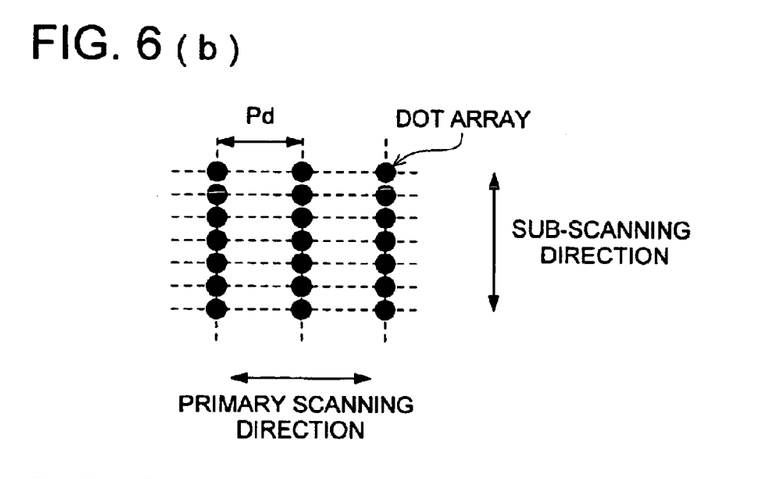

In order to form an image rich in gradation, it is desirable to make the reproduction of tone by making the dot density in the dot arrangement higher in one direction as shown in FIG. 6(b) and varying the length of dots in the main scanning direction. In FIG. 6(b), the vertical direction of the dot screen is taken for the sub-scanning direction in exposure, and the representation of tone is made by varying the length of dots in the main scanning direction by the control of the beam lighting duration for the dots, that is, the width of the respective pulses to drive the exposure light source.

In cases where image formation is carried out using such an exposure method, it is especially effective for the surface processing to satisfy the conditions described in the above-mentioned conclusions (1) to (3) in the case where the surface processing is carried out by the movement of the cutting tool with a constant pitch in the main scanning direction.

Besides, it is desirable to use a toner composed of small-sized toner particles having a number-average particle diameter of 2 μm to 7 μm in the development process for developing a latent image based on the above-mentioned dot arrangement, and by the use of such a toner composed of small-sized toner particles, a clear image having a high resolution can be formed.

The calculation of the particle diameter distribution of a toner and the measurement of its number-average particle diameter can be made by means of a Coulter counter TA-II, a Coulter multisizer, an SLAD 1000 (a particle diameter measuring instrument of a laser diffraction type manufactured by Shimadzu Corporation), or the like.

In the measurement of the above-mentioned number-average particle diameter, a Coulter multisizer was used connected to an interface for outputting the particle diameter distribution (manufactured by NIKKAKI Corp.) and a personal computer.

EXAMPLES

Example of Practice 1

Cutting tool pitch X=0.1 mm
Radius of curvature of edge corner of cutting tool R=5 mm
Diameter of substrate PC11 φ=60 mm
Surface roughness Rz=1.038 μm
Surface roughness Z=0.2 μm
Organic photoconductor layer (photosensitive layer):
Phthalocyanine pigment particles dispersed in polycarbonate resin coated to form an organic photoconductor layer having a thickness of 25 μm
Moving speed of photoreceptor PC1 in sub-scanning direction in image formation=220 mm/s
Exposure laser: Semiconductor laser, 300 μW
Development method: Two-component development
Screen: Main scanning direction: 120 dpi (120 dots/25.4 mm), Sub-scanning direction: 600 dpi (600 dots/25.4 mm)

As the result of image formation under the above-mentioned conditions, an image having no density unevenness was formed.

Example of Practice 2
Cutting tool pitch X=0.2 mm
Radius of curvature of edge corner of cutting tool R=20 mm
Surface roughness Rz=1.209 μm
Surface roughness Z=0.2 μm
Other conditions made the same as example of practice 1

As the result of image formation under the above-mentioned conditions, an image having no density unevenness was formed.

Example of Practice 3

Cutting tool pitch X=0.13 mm
Radius of curvature of edge corner of cutting tool R=5 mm
Surface roughness Rz=1.151 μm
Surface roughness Z=0.42 μm
Other conditions made the same as example of practice 1

As the result of image formation under the above-mentioned conditions, an image having no density unevenness was formed.

Example for Comparison 1

Cutting tool pitch X=0.2 mm
Radius of curvature of edge corner of cutting tool R=5 mm
Surface roughness Rz=1.635 μm
Surface roughness Z=1 μm
Other conditions made the same as example of practice 1

As the result of image formation under the above-mentioned conditions, density unevenness was generated in the image.

Example for Comparison 2

Cutting tool pitch X=0.26 mm
Radius of curvature of edge corner of cutting tool R=5 mm
Surface roughness Rz=2.337 μm
Surface roughness Z=1.7 μm
Other conditions made the same as example of practice 1

As the result of image formation under the above-mentioned conditions, density unevenness was generated in the image.

Example for Comparison 3

Cutting tool pitch X=0.3 mm
Radius of curvature of edge corner of cutting tool R=5 mm
Surface roughness Rz=2.805 μm
Surface roughness Z=2.2 μm
Other conditions made the same as example of practice 1

As the result of image formation under the above-mentioned conditions, density unevenness was generated in the image.

The values of the surface roughness Rz were measured by means of a Surfcorder SE-30D manufactured by Kosaka Laboratory, Ltd. with the sampling length taken as 2.5 mm.

Figure 4A:
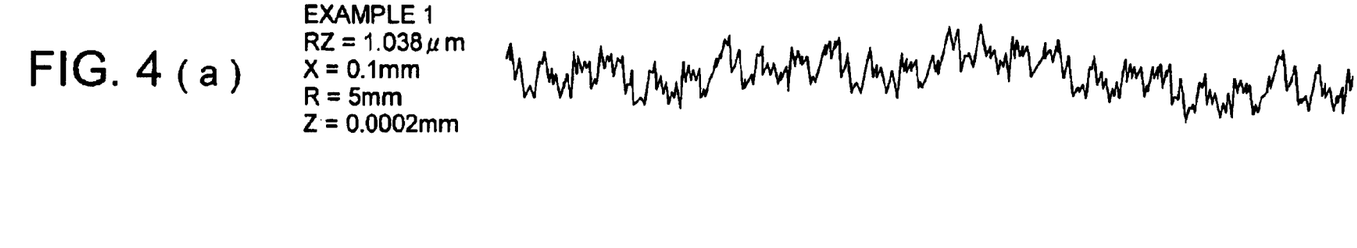
FIG. 4(a) to FIG. 4(c) are drawings showing measurement charts of the surface state of the substrate of a photoreceptor according to the embodiment of this invention.
Figure 4B:
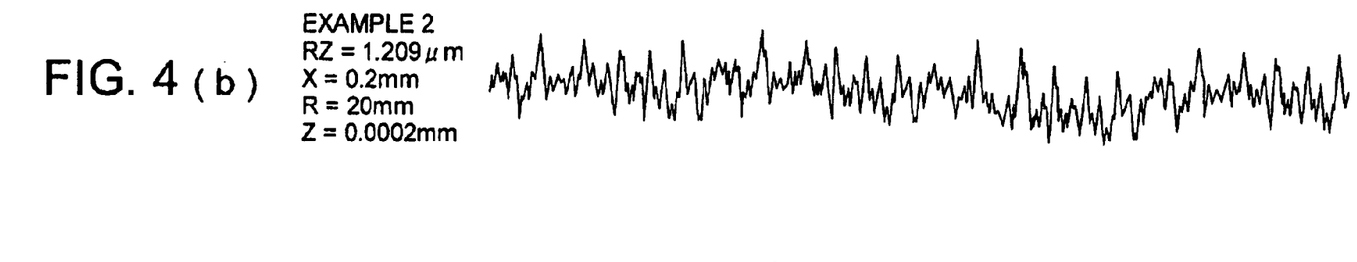
Figure 4C:
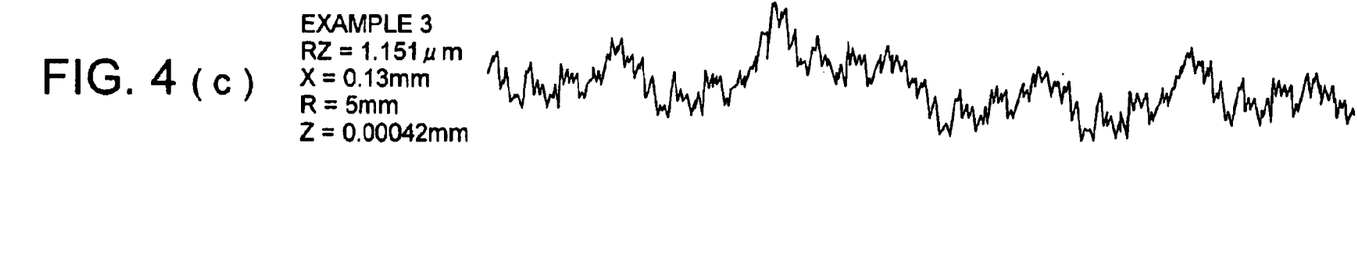
Figure 5A:
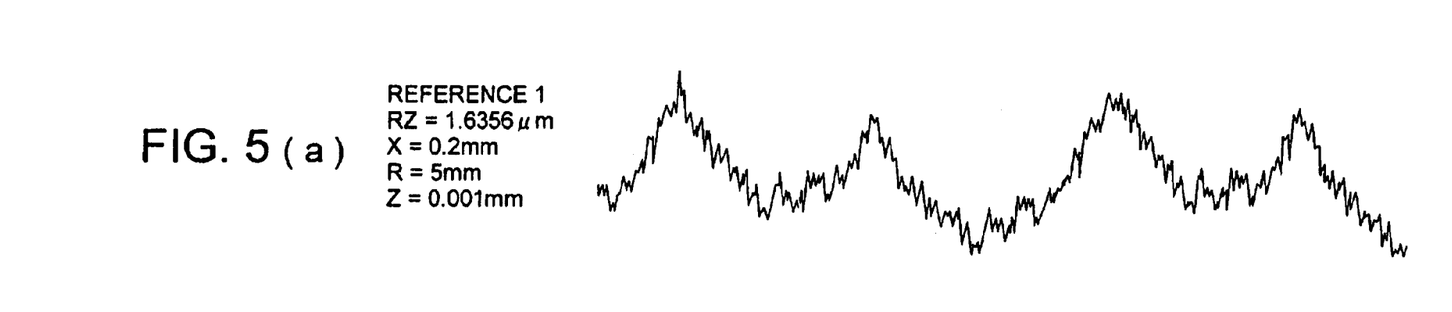
FIG. 5(a) to FIG. 5(c) are drawings showing measurement charts of the surface state in examples for comparison.
Figures 5B, 5C:
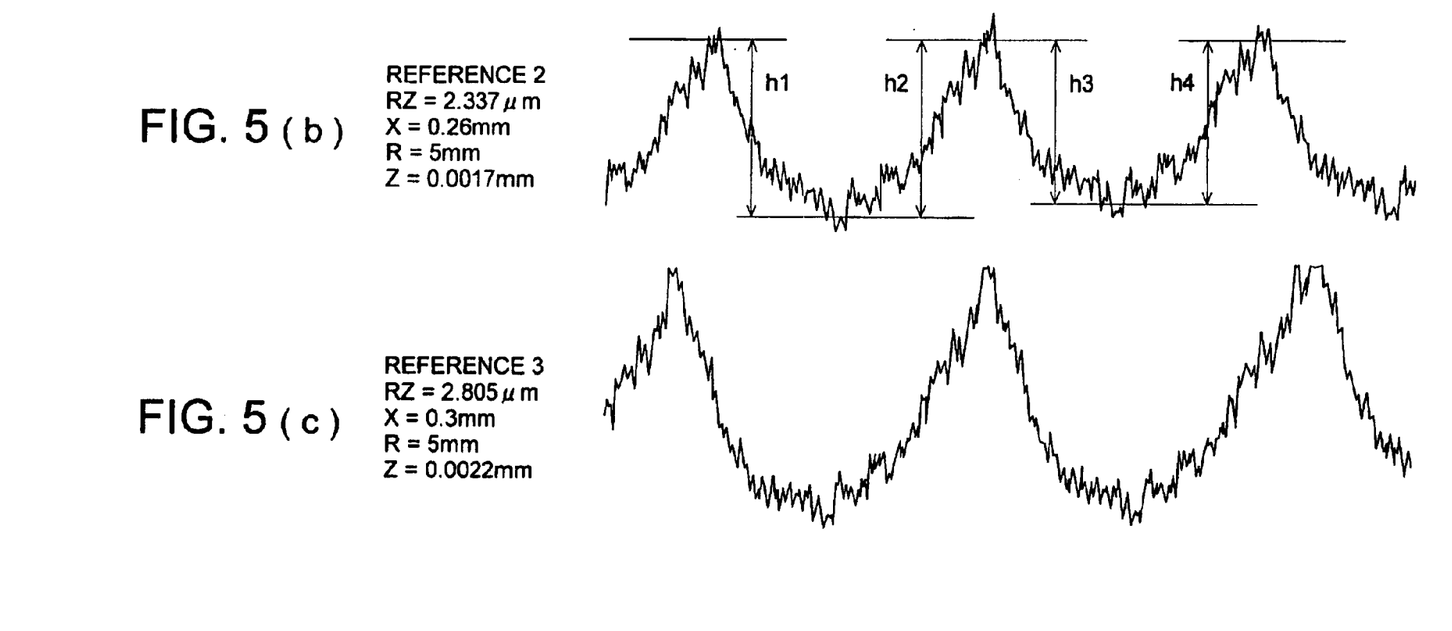

Measurement charts of the surface state of a substrate measured by means of the above-mentioned Surfcorder are shown in FIG. 4 and FIG. 5.

In the example of practices shown in FIG. 4, there are substantially no linear surface inequalities corresponding to the feed pitch of the cutting tool, but in the examples for comparison shown in FIG. 5, there are linear surface inequalities corresponding to the feed pitch of the cutting tool.

As explained in the foregoing, by any one of the structures (1) to (3), or (5) to (10) of the invention, the generation of a moire caused by the screen of a dot image and the linear surface inequalities produced by surface processing of the substrate of a photoreceptor is satisfactorily prevented, and a clear image having no density unevenness is formed.

By the structure (4) of the invention, a clear image being rich in gradation and having no density unevenness is formed.

Example of Embodiment of Invention (2)

In the following, another example of the embodiment of this invention will be explained with reference to the drawings.

Figure 8:
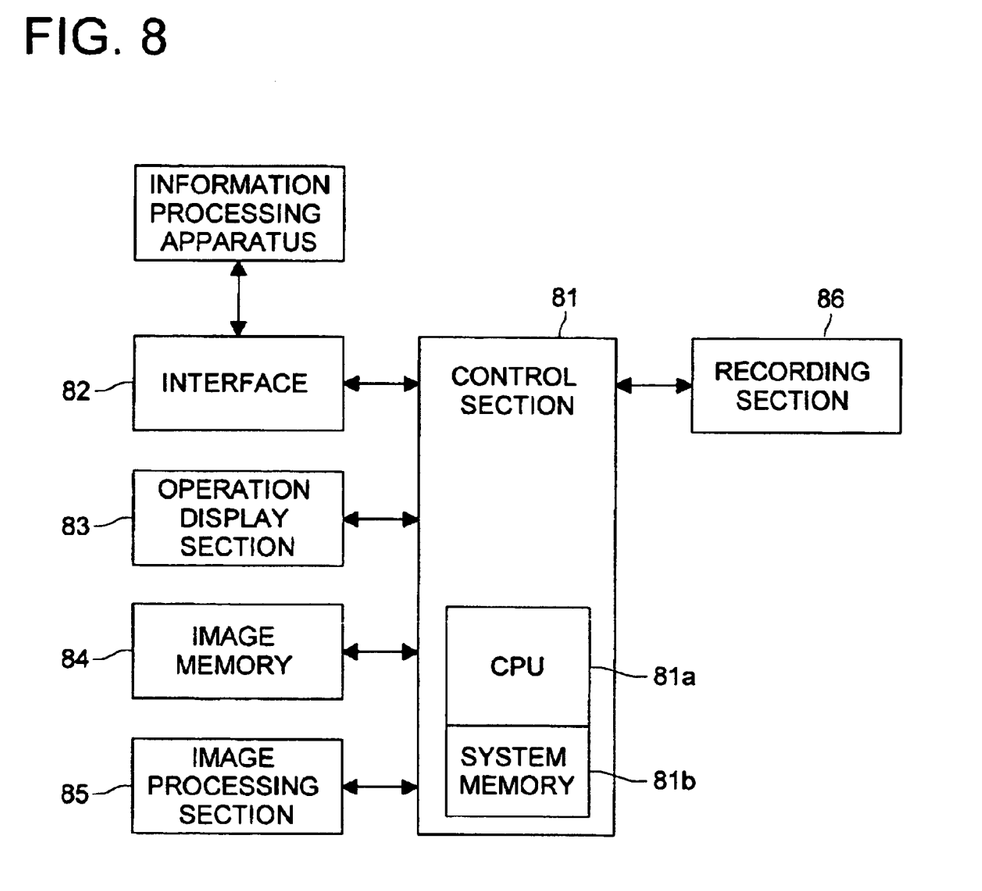
FIG. 8 is a block diagram for illustrating the structure of the control system of an image forming apparatus of another example of the embodiment of this invention.

As shown in FIG. 8, an image forming apparatus of this invention has a structure comprising a control section 81 for controlling every structural part in accordance with a specified control program, an interface 82 for sending and receiving image data etc. to and from an external information processing apparatus such as a personal computer, an operation display section 83 for carrying out various kinds of setting and display, an image storage 84 made up of, for example, a RAM for storing image data transferred from said external information processing apparatus, an image processing section 85 for transforming image data into those of a specified screen, and a recording section 86 for carrying out image formation of image data transformed into those of a specified screen onto a sheet of transfer paper P.

The control section 81 has a function as a control means for managing the state of every structural part of the image forming apparatus to practice a control, and at the same time, practicing image processing of image data stored in the image storage 84 in the image processing section 85, to carry out image formation in the recording section 86 on the basis of the image data subjected to image processing. In order to perform the above-mentioned function, to state it concretely, the control section 81 comprises a CPU 81a, and a system storage 81b which stores various kinds of control program and various kinds of data necessary for practicing the control programs, and makes up a work area for practicing a control program.

The interface 82 makes connection with external information processing apparatus such as a personal computer and sending and receiving of image data are practiced through it; it has a structure comprising a microprocessor for carrying out transmission control, a hard disk or a RAM for storing various kinds of data, an interface of a type such as SCSI or 10BASE-T, etc., and structural members for mounting etc.

The operation display section 83 consists of a touch panel for carrying out receipt of operation and an LCD for carrying out display of a pattern and/or characters. Further, it makes up a display operation part which is supposed to be operated by the pressing of the touch panel at positions displayed on the LCD.

Figure 9:
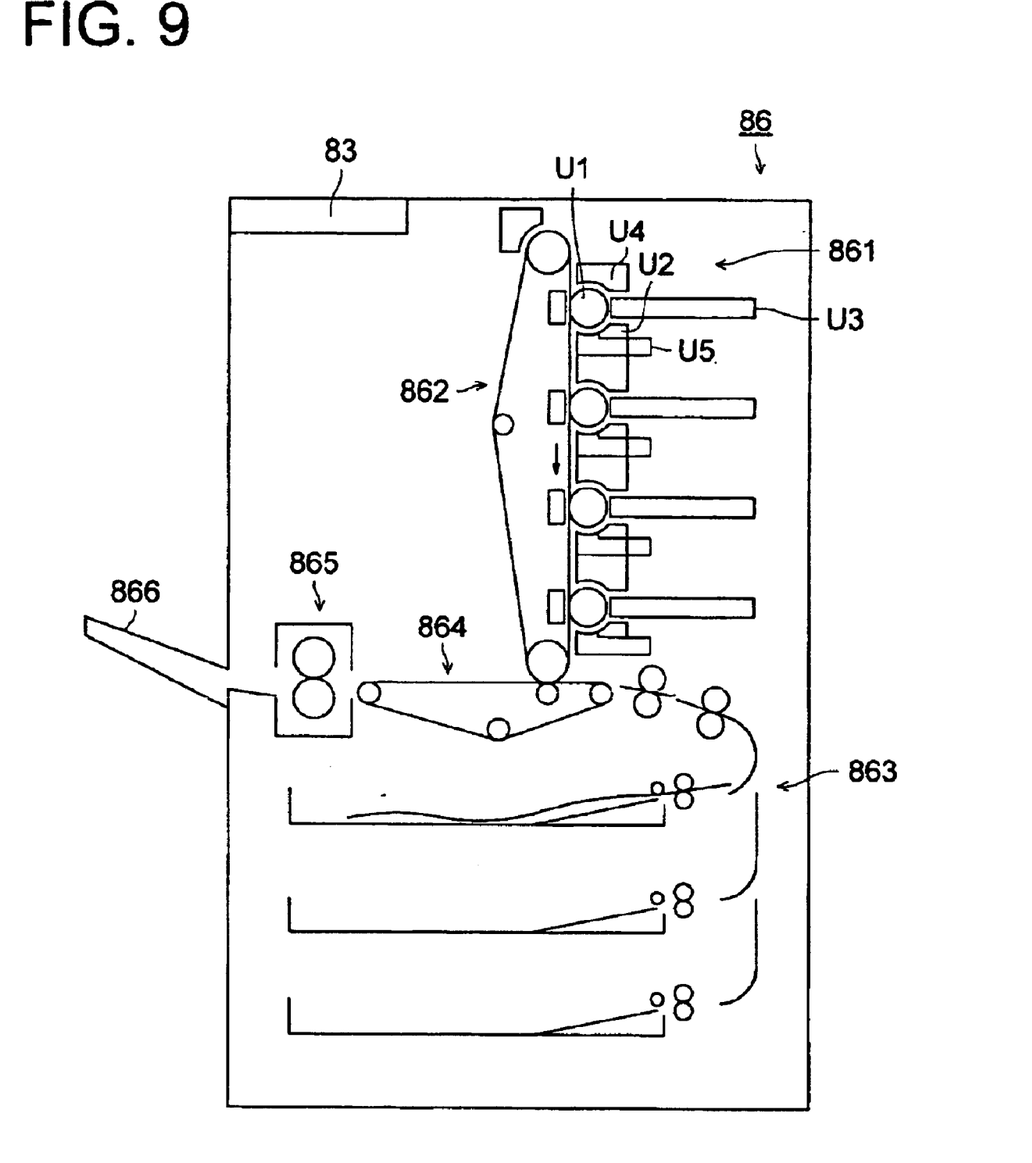
FIG. 9 is a cross-sectional view showing the overall structure of the recording section of the image forming apparatus shown in FIG. 8.

As shown in FIG. 9, the recording section 86 consists of an image forming subsection 861 for forming each of the component color toner images on the image carrying member U1 for each of component colors, an intermediate transfer subsection 862 for transferring the component color toner images formed in the image forming subsection 861 and once transferred onto it together onto a sheet of recording paper, a paper feed subsection 863 for accommodating and selectively feeding sheets of recording paper, a transfer subsection 864 for transferring toner images from the intermediate transfer subsection 862 to a sheet of recording paper, a fixing subsection 865 for fixing the toner images transferred to the sheet of recording paper on it, and an output tray 866 for stacking ejected sheets of recording paper. Further, each of the subsections of the recording section 86 is driven by a drive means (not shown in the drawing) and is controlled by the control section 81.

As regards the image forming subsection 861, each unit for each of the component colors consists of the image carrying member U1 whose surface is to be scanned rotating counter-clockwise, a charging portion U2 for giving charge to the image carrying member U1, a scanning optical device U3 for forming a latent image using a laser beam on the charged image carrying member U1, a developing device U4 for developing the latent image formed using a developer, and a cleaning portion U5 for collecting residual toner particles after the toner image formed on the image carrying member U1 is transferred to the intermediate transfer subsection 862.

Figure 10:
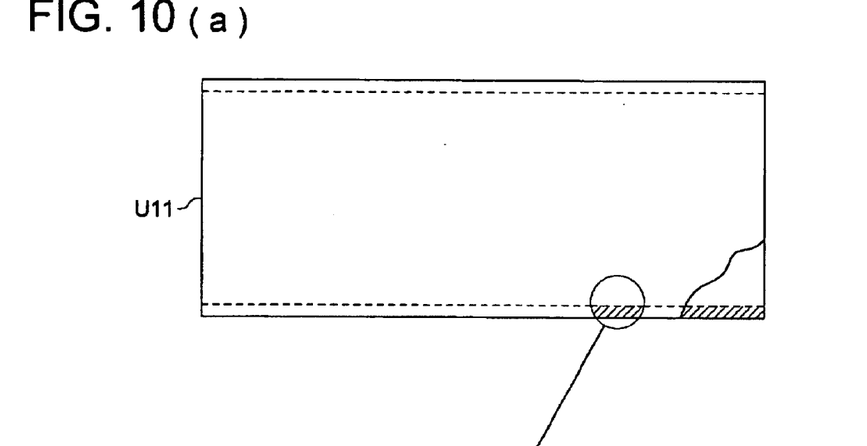
FIG. 10(a) to FIG. 10(c) are illustrative drawings of the surface of the substrate of an image carrying member.
Figure 11:
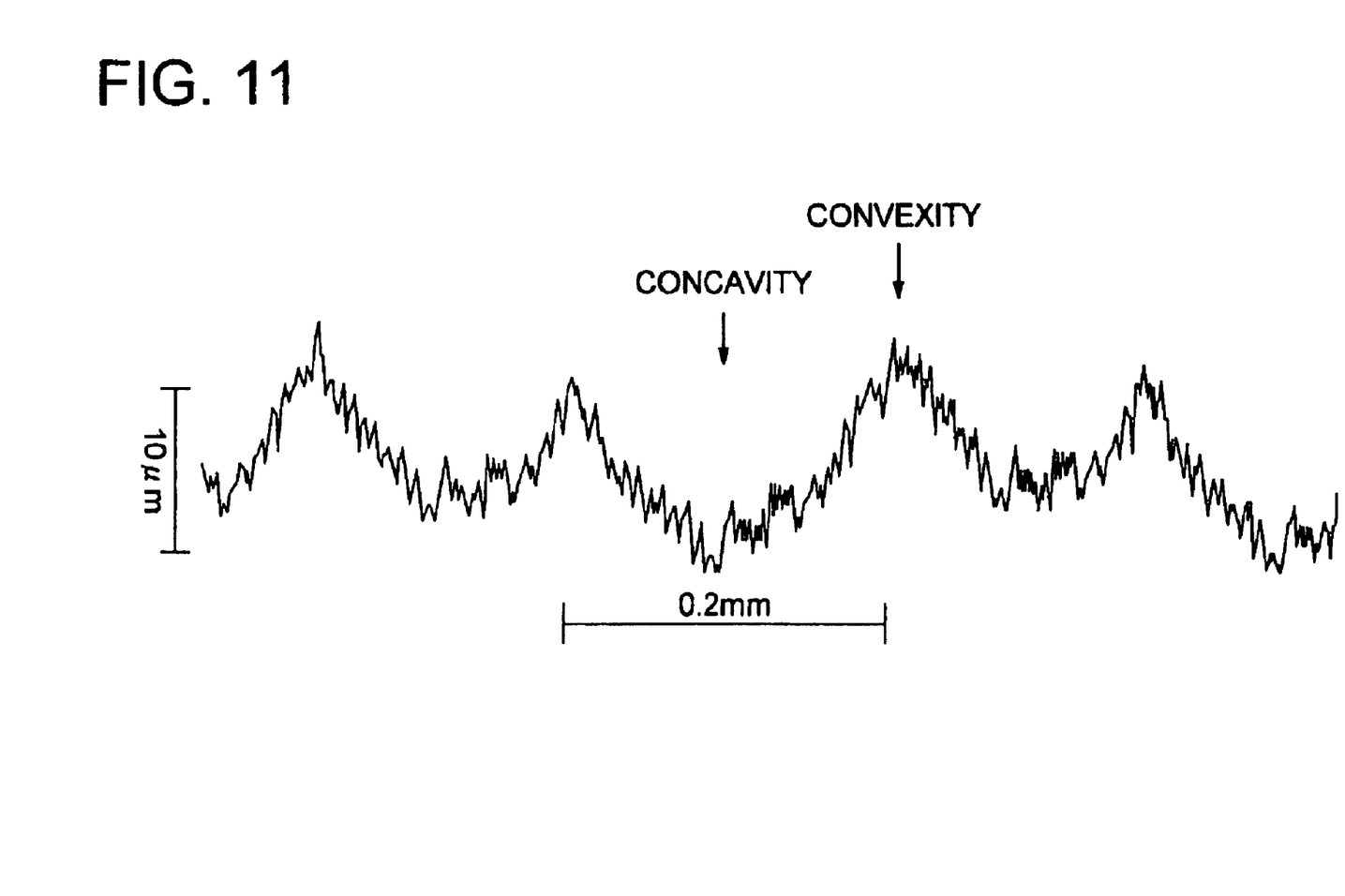
FIG. 11 is an illustrative drawing showing an example of a cross-section curve showing the surface roughness of a the surface of a substrate.

The image carrying member U1 is formed of a photosensitive material layer coated on a cylindrical substrate U11 made of aluminum for example. The surface of the substrate U11, as shown in FIG. 10(a) and FIG. 10(b) has linear surface inequalities (projections and concavities) of a constant size formed with a definite pitch in a definite direction by the feed pitch of the cutting tool Pm (mm), in such a way that no moire is generated by the fluctuation of the thickness of the photosensitive material layer to be coated, has further inequalities finer than the projections and concavities of the pitch Pm formed by the roughness of the cutting edge corner of the cutting tool between each of said projections and concavities in the cut working, and has coated with a photosensitive material layer U12 on it. For a concrete example of the cross-sectional shape of the surface of the substrate U11, a cross-sectional curve showing the roughness of the substrate surface subjected to cut working with a cutting tool having a radius of curvature of the edge corner R of 5 mm at a feed pitch of 0.2 mm is shown in FIG. 11.

A latent image is formed on the above-mentioned image carrying member U1 using a laser beam.

A method of forming a color image by an image forming apparatus having a structure as described in the above will be explained.

First, image data are transferred from the information processing apparatus to the interface 82, and the transferred image data are stored in the image storage 84. Further, image processing is done in the image processing section 85.

As regards a method of forming a color image by means of such an image forming apparatus, in the case where image formation is done with dot arrangement set in such a manner that the size of one pixel is approximately the same as the beam diameter of the laser beam as shown in FIG. 6(a), to have a resolution of 600 dpi (main scanning)×600 dpi (sub-scanning) for example, it is difficult to make each pixel have a tone reproducing capability; therefore, it is general to carry out image formation through the processing of data of every component colors using an error diffusion method.

However, in this example of the embodiment, for the purpose of obtaining a higher-quality color image, image formation is done with every pixel made to have a capability of tone reproduction. In order to make every pixel have a capability of tone reproduction, for example, image formation is done with a dot arrangement (hereinafter referred to as a screen) consisting of dot lines in the sub-scanning direction of the same resolution as shown in FIG. 6(a) and dot lines in the main scanning direction with an equal interval of dots, that is, a pitch Pd. For example, image formation is done with a screen of the resolution 200 dpi×600 dpi. By this structure, the irradiation time for one pixel by the laser beam can be controlled within the pitch Pd, and it is possible to make every pixel have a capability of tone reproduction.

Figure 6C:
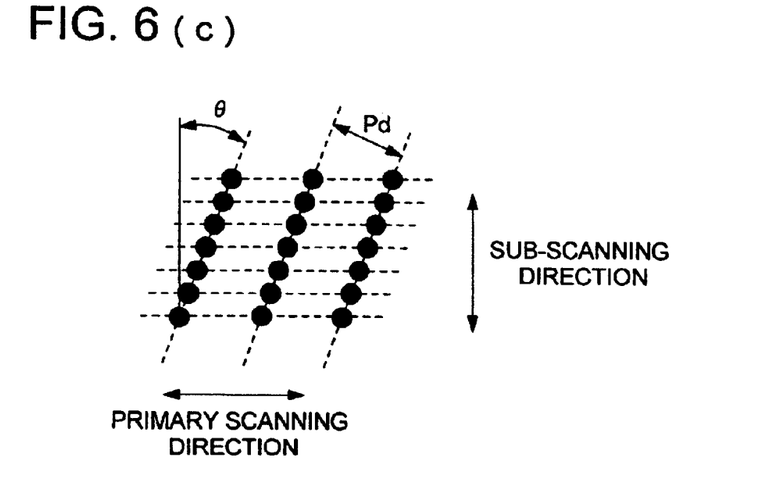

Further, for example, in the case where image formation is done with a plurality of dot arrangements for the respective component colors superposed, the hue is changed by a slight positional deviation of dots, which makes it impossible to obtain a high-quality color image in some cases. Hence, as shown in FIG. 6(c), image formation is done with screens for the respective colors made different in the angle θ so as to make the dot lines not overlap one another as much as possible.

Further, in this example of the embodiment, the image carrying member U1 having the substrate U11 having a definite-direction linear inequalities formed on the surface with the feed pitch of the cutting tool Pm is used. Hence, in order not to generate density unevenness that can be discriminated visually caused by the interference between the inequalities of the pitch Pm and the screen of the pitch Pd, the feed pitch of the cutting tool Pm, the pitch of the screen Pd, and the angle θ between the direction of the linear inequalities and the direction of the dot lines are determined in such a way as will be shown in the illustration described later. In FIG. 6(c), the angle θ is the angle between the direction of the dot lines in the screen and the sub-scanning direction; however, because the sub-scanning direction approximately agrees with the direction of the linear inequalities, the angle θ is also regarded as the angle between the direction of the linear inequalities and the direction of the dot lines.

1̂ The angle of the screen is made equal to or greater than a specified angle. If the angle θ between the direction of the linear inequalities and the direction of the dot lines is 90°, no interference fringe is generated, resulting in no generation of density unevenness. As regards the range from 0° to 90°, in this example of the embodiment, it was proved experimentally that if θ exceeds 30°, the interference fringes became difficult to visually discriminate as density unevenness. Therefore, it is desirable that the specified angle referred to herein is not less than 30°.

2̂ If the angle of the screen is not greater than a specified angle, the spatial frequency, which is the number of lines per unit length, of the screen and of the feed pitch of the cutting tool are separately obtained, and the screen and the feed pitch of the cutting tool are determined so as to make the difference between the both spatial frequencies not smaller than the specified value.

Now, explanation will be given in more detail with it taken for instance, the case where the resolution in the sub-scanning direction is 600 dpi and the angle of the screen is 0°.

The spatial frequency X1 of the screen of the dot pitch X is expressed by $$X1=1/((25.4/600) \times X)(\text{lines/mm}[1/\text{mm}]),$$

and the spatial frequency Y1 corresponding to the feed pitch of the cutting tool Y is expressed by $$Y1=1/Y(\text{lines/mm}[1/\text{mm}]).$$

Hence, the pitch of the interference fringes Z caused by the pitch of the screen and the feed pitch of the cutting tool is obtained from the equation $$z=1/|X1-Y1|.$$

The values of Z for the pitch of screen from 3 dots/mm to 7 dots/mm, and the pitch of the cutting tool from 0.1 mm to 3 mm are shown in Table 1.

TABLE 1

| Feed pitch of cutting tool Y | Y1 | Pitch of screen X | | | | |
|---|---|---|---|---|---|---|
| | | 3 | 4 | 5 | 6 | 7 |
| | | X1 | | | | |
| | | 7.874 | 5.906 | 4.724 | 3.937 | 3.375 |
| 0.1 | 10.000 | 0.470 | 0.244 | 0.190 | 0.165 | 0.151 |
| 0.11 | 9.091 | 0.822 | 0.314 | 0.229 | 0.194 | 0.175 |
| 0.12 | 8.333 | 2.177 | 0.412 | 0.277 | 0.227 | 0.202 |
| 0.13 | 7.692 | 5.503 | 0.560 | 0.337 | 0.266 | 0.232 |
| 0.14 | 7.143 | 1.368 | 0.808 | 0.413 | 0.312 | 0.265 |
| 0.15 | 6.667 | 0.828 | 1.314 | 0.515 | 0.366 | 0.304 |
| 0.16 | 6.250 | 0.616 | 2.903 | 0.655 | 0.432 | 0.348 |
| 0.17 | 5.882 | 0.502 | 43.180 | 0.864 | 0.514 | 0.399 |
| 0.18 | 5.556 | 0.431 | 2.858 | 1.203 | 0.618 | 0.459 |
| 0.19 | 5.263 | 0.383 | 1.557 | 1.856 | 0.754 | 0.529 |
| 0.2 | 5.000 | 0.348 | 1.104 | 3.629 | 0.941 | 0.615 |
| 0.21 | 4.762 | 0.321 | 0.874 | 26.670 | 1.212 | 0.721 |
| 0.22 | 4.545 | 0.300 | 0.735 | 5.588 | 1.644 | 0.854 |
| 0.23 | 4.348 | 0.284 | 0.642 | 2.655 | 2.434 | 1.027 |
| 0.24 | 4.167 | 0.270 | 0.575 | 1.793 | 4.654 | 1.262 |
| 0.25 | 4.000 | 0.258 | 0.525 | 1.380 | 15.875 | 1.599 |
| 0.26 | 3.846 | 0.248 | 0.486 | 1.139 | 11.007 | 2.121 |
| 0.27 | 3.704 | 0.240 | 0.454 | 0.980 | 4.286 | 3.038 |
| 0.28 | 3.571 | 0.232 | 0.428 | 0.867 | 2.735 | 5.080 |
| 0.29 | 3.448 | 0.226 | 0.407 | 0.784 | 2.046 | 13.569 |
| 0.3 | 3.333 | 0.220 | 0.389 | 0.719 | 1.657 | 24.245 |

From the result shown in Table 1, in this example of the embodiment, the following can be said experimentally. That is, the pitch of the interference fringes Z exceeds 1 in the range surrounded by the single dot and a dash line. In this range, the interference fringes can be visually discriminated as density unevenness. Further, the pitch of the interference fringes Z exceeds 0.5 in the range surrounded by the broken line. In this range, the interference fringes can be visually discriminated as density unevenness in some cases. Hence, if the pitch of the screen and the feed pitch of the cutting tool are selected so as to make the pitch of the interference fringes Z desirably not exceed 1, and more desirably not exceed 0.5, the interference fringes become difficult to visually discriminate as density unevenness. That is, the interference fringes become difficult to visually discriminate as density unevenness by it that the difference in the spatial frequency between the pitch of the screen and the feed pitch of the cutting tool is desirably made equal to or greater than 1 and more desirably made equal to 2 or greater than 2.

By an image formation being done in the above-mentioned way, it can be obtained a high-quality color image in which density unevenness generated by the pitch of the screen and the feed pitch of the cutting tool is not remarkable.

Further, examples will be shown in the following.

Example of Practice 1

L/S (recording speed in the sub-scanning direction)=220 mm/s

Photoreceptor drum (image carrying member) diameter φ=60 mm

Organic photoconductive layer (photosensitive layer): Phthalocyanine pigment particles dispersed in polycarbonate coated Feed pitch of cutting tool=0.2 mm Exposure laser: Semiconductor laser, 300 μW Development method: Two-component development Screen: angle=45°, 600 dpi in sub-scanning direction, with pitch Pd 3 dots/mm to 7 dots/mm Under the above-mentioned conditions, density unevenness could not be discriminated.

Example of Practice 2

Feed pitch of cutting tool=0.25 mm

Screen: angle=0°, 600 dpi in sub-scanning direction, with pitch Pd 3 dots/mm

Other conditions: same as those in example of practice 1

Under the above-mentioned conditions (the difference in spatial frequency: 3.87), density unevenness could not be discriminated.

Example for Comparison

Feed pitch of cutting tool=0.2 mm

Screen: angle=0°, 600 dpi in sub-scanning direction, with pitch pd 5 dots/mm

Other conditions: same as those in example of practice 1

Under the above-mentioned conditions (the difference in spatial frequency: 0.28), density unevenness could be discriminated.

As explained up to now, it can be provided an image forming apparatus wherein generation of density unevenness is suppressed by the practice of image formation with the pitch of the inequalities on the surface of the substrate of the image carrying member and the dot arrangement taken into consideration.

What is claimed is:

1. An image forming apparatus comprising:
    a photoreceptor having a substrate whose surface has been subjected to a surface processing with a cutting tool, and a photosensitive layer formed on the substrate;
    an exposure device for exposing an image on the photoreceptor to form a latent image, said exposure device having a light source for emitting a light beam, and carrying out exposure in a manner of dot arrangement through a main scanning by deflection of the light beam and a sub-scanning by a movement of the photoreceptor;
    a developing device for developing the latent image with a toner to form a toner image; and a transfer device for transferring the toner image onto a medium, wherein the exposure device carries out the exposure in the main scanning direction with a spatial frequency of dot arrangement pitch of not less than 4 dots/mm, and wherein a cross-sectional surface shape of the substrate in the main scanning direction has substantially no projections and concavities of a period corresponding to a feed pitch of the cutting tool used in the surface processing.

2. The image forming apparatus of claim 1, wherein an average value (H) of projections and concavities of a period corresponding to a feed pitch of the cutting tool is not greater than 9 $\mu$m.

3. The image forming apparatus of claim 1, wherein the exposure device carries out the exposure with a dot arrangement such that dot density in the sub-scanning direction is made larger than dot density in the main scanning direction.

4. The image forming apparatus of claim 1, wherein a toner comprising toner particles having a number-average particle diameter of 2 $\mu$m to 7 $\mu$m is used for developing the latent image.

5. The image forming apparatus of claim 1, wherein the substrate of the photoreceptor comprises a metallic cylinder.

6. An image forming apparatus comprising:

a photoreceptor having a substrate whose surface has been subjected to a surface processing with a cutting tool, and a photosensitive layer formed on the substrate;

an exposure device for exposing an image on the photoreceptor to form a latent image, said exposure device having a light source for emitting a light beam, and carrying out exposure in a manner of dot arrangement through a main scanning by deflection of the light beam and a sub-scanning by a movement of the photoreceptor;

a developing device for developing the latent image with a toner to form a toner image; and a transfer device for transferring the toner image onto a medium, wherein the exposure device carries out the exposure in the main scanning direction with a spatial frequency of dot arrangement pitch of not less than 4 dots/mm, and wherein the surface of the substrate has been surface processed to satisfy:

$$R-R \cos [\{(X/2)/2\pi R\} \times 360] < 0.001,$$

where:

R denotes the a radius of curvature (mm) of an edge corner of the cutting tool used in the surface processing, and X denotes a feed pitch of the cutting tool (mm) used in the surface processing.

7. A method of manufacturing a metallic cylinder substrate for a photoreceptor, comprising carrying out a surface processing with a cutting tool satisfying:

$$R-R \cos [\{(X/2)/(2\pi R)\} \times 360] < 0.001,$$

where:

R denotes a radius of curvature (mm) of an edge corner of a cutting tool used in the surface processing, and X denotes a feed pitch of the cutting tool (mm) used in the surface processing.

8. A substrate for a photoreceptor subjected to a surface processing with a cutting tool satisfying:

$$R-R \cos [\{(X/2)/(2\pi R)\} \times 360] < 0.001,$$

where:

R denotes a radius of curvature (mm) of an edge of corner of a cutting tool used in the surface processing, and X denotes a feed pitch of the cutting tool (mm) used in the surface processing.

9. A photoreceptor comprising a substrate and a photosensitive layer provided on the substrate, wherein the substrate is subjected to a surface processing with a cutting tool satisfying:

$$R-R \cos [\{(X/2)/(2\pi R)\} \times 360] < 0.001,$$

where:

R denotes a radius of curvature (mm) of an edge corner of the cutting tool used in the surface processing, and X denotes a feed pitch of the cutting tool (mm) used in the surface processing.

10. The photoreceptor of claim 9, wherein the photosensitive layer has a thickness of 10 $\mu$m through 30 $\mu$m.

11. An image forming apparatus comprising:

a cylindrical photoreceptor having a substrate whose surface has been subjected to a surface processing with a cutting tool, and a photosensitive layer formed on the substrate;

an exposure device for exposing an image on the photoreceptor to form a latent image, said exposure device including a light source for emitting a light beam;

a developing device for developing the latent image with a toner to form a toner image; and a transfer device for transferring the toner image onto a medium, wherein by scanning the cylindrical photoreceptor in a longitudinal direction with the light beam, a latent image component comprising a plurality of dots is formed in a main scanning direction, and a plurality of the latent image components are formed in a rotating direction of the cylindrical photoreceptor in a sub-scanning direction to form the latent image, wherein the surface of the substrate of the cylindrical photoreceptor has linear surface inequalities including at least one of projections and concavities, caused by a feed pitch of the cutting tool and formed during the surface processing with the cutting tool, and wherein the latent image formed by the scanning comprises a plurality of dot lines formed in the sub-scanning direction arrayed at equal intervals with a pitch in the main scanning direction, and each of the plurality of dot lines is formed at an angle not smaller than a specified angle with a direction of the linear surface inequalities formed on the surface of the substrate.

12. The image forming apparatus of claim 11, wherein the specified angle is not smaller than 30°.

13. The image forming apparatus of claim 11, wherein the surface of the substrate of the cylindrical photoreceptor has finer surface inequalities between the projections formed by the feed pitch of the cutting tool during the surface processing with the cutting tool.

14. An image forming apparatus comprising:

a cylindrical photoreceptor having a substrate whose surface has been subjected to a surface processing with a cutting tool, and a photosensitive layer formed on the substrate;

an exposure device for exposing an image on the photoreceptor to form a latent image, said exposure device including a light source for emitting a light beam;

a developing device for developing the latent image with a toner to form a toner image; and a transfer device for transferring the toner image onto a medium, wherein by scanning the cylindrical photoreceptor in a longitudinal direction with the light beam, a latent image component comprising a plurality of dots is formed in the a main scanning direction, and a plurality of the latent image components are formed in a rotating direction of the cylindrical photoreceptor in a sub-scanning direction to form the latent image, wherein the surface of the substrate of the cylindrical photoreceptor has linear surface inequalities including at least one of projections and concavities caused by a feed pitch of the cutting tool formed during the surface processing with the cutting tool, wherein the latent image comprises a plurality of dot lines formed in the sub-scanning direction arrayed at equal intervals with a pitch in the main scanning direction, and each of the plurality of dot lines is formed at an angle smaller than a specified angle with a direction of the linear surface inequalities formed on the surface of the substrate, and wherein at least one of the feed pitch of the cutting tool and the pitch of the array of the dot lines in the main scanning direction are determined so that a difference between a number of the surface inequalities per unit length and a number of the dot lines per unit length not smaller than a specified number.

15. The image forming apparatus of claim 14, wherein the specified number is not less than 1 line per 1 mm.

16. The image forming apparatus of claim 14, wherein the specified angle is not larger than 30°.

* * * * *